United States Patent [19]

Robinson et al.

[11] Patent Number: 4,747,072
[45] Date of Patent: May 24, 1988

[54] PATTERN ADDRESSABLE MEMORY

[75] Inventors: Ian N. Robinson, Mountain View; Alan L. Davis, Half Moon Bay, both of Calif.

[73] Assignee: Fairchild Camera and Instrument Corporation, Mountain View, Calif.

[21] Appl. No.: 765,370

[22] Filed: Aug. 13, 1985

[51] Int. Cl.$^4$ .............................................. G06F 7/22
[52] U.S. Cl. .................................... 364/900; 364/200
[58] Field of Search ... 364/200 MS File, 900 MS File

[56] References Cited

U.S. PATENT DOCUMENTS

| | | |
|---|---|---|
| 3,245,052 | 4/1966 | Lewin . |
| 3,906,455 | 9/1975 | Houston et al. . |
| 3,909,796 | 9/1975 | Kitamura ............................ 364/900 |
| 4,450,520 | 5/1984 | Hollaar et al. ....................... 364/200 |
| 4,451,901 | 5/1984 | Wolfe et al. .......................... 364/900 |
| 4,499,553 | 2/1985 | Dickinson et al. ................... 364/900 |

Primary Examiner—Gareth D. Shaw
Assistant Examiner—Christina Eakman
Attorney, Agent, or Firm—Theodore S. Park; Calvin B. Ward

[57] ABSTRACT

A memory system for storing and retrieving data sequences of symbols in response to a query sequence is disclosed. Each of the sequences is made up of three types of symbols, constants, delimiters, and variables. A data sequence is retrieved in response to a query sequence if the two sequence can be made identical by replacing the variables in each sequence by constants or combinations of constants and delimiters, the combinations beginning and ending with a delimiter. To reduce the time needed to search the memory for all data sequences corresponding to a given query sequence, multiple processing units are employed. In addition to carrying out rule-based searches, the memory system can efficiently retrieve all records containing a specified list of key words.

16 Claims, 9 Drawing Sheets

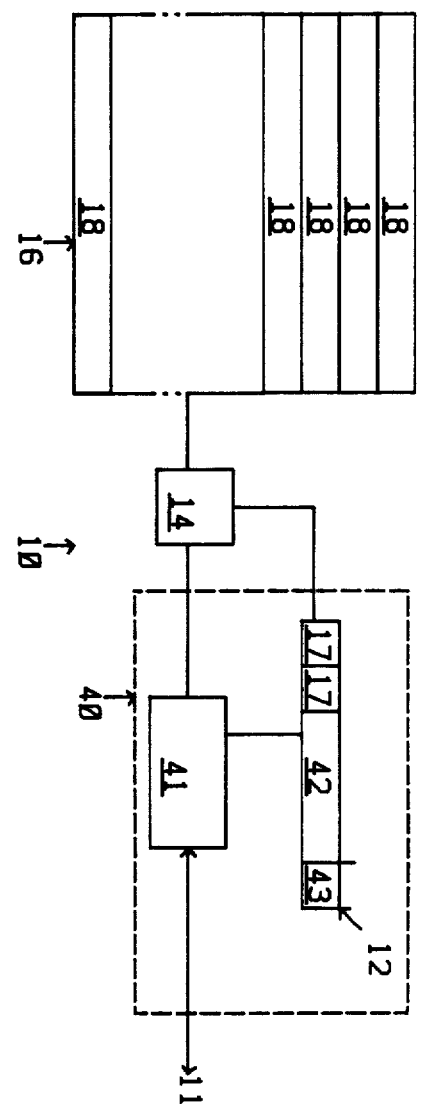
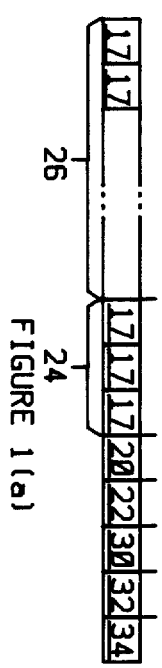
FIGURE 1
FIGURE 1(a)

PATTERN ADDRESSABLE MEMORY

The present invention is directed generally to the field of data processing systems and more particularly to memory systems for use in data processing systems.

Essentially all data processing systems used in artificial intelligence systems require that information be stored and selectively retrieved. The information is normally organized as a database, stored in a memory, which consists of a number of records which are to be retrieved one at a time. Normally, each record is retrieved as a unit. The simplest example of a database retrieval involves retrieving all records that contain one or more keywords. For example, the database might consist of all the articles in a particular set of scientific journals, one article per record. Here one would like to retrieve all articles containing one or more key words, such as all records containing the words "computing" and "artificial intelligence".

In "expert systems" the database is codified into rules which must be searched repeatedly for rules conforming to a given specification. This given specification may be referred to as a "query sequence". This type of search, referred to as a "rule-based" search, differs significantly from the search for records containing one or more key words described above. The system must choose which of the many rules in the database to apply next to the problem at hand. This choice will depend on the data and relationships between the variables in the problem being solved. The expert system must select those rules which contain the same data and/or relationships between the variables. For example, these rules may be of the form:

If <condition> then <action or conclusion>. One of the rules in the data base might be as follows:

if (x eats) then (x is hungry).

If the problem contains the information "Peter eats", the system would be faced with the task of searching all the rules for one containing (x eats). Here x is a variable element which may be replaced by any element in the known information. The above rule together with any others involving "eats" would be retrieved. Once the system has retrieved the rule, it substitutes Peter for x and then concludes that Peter is hungry.

The rule-based search differs significantly from the simple keyword or key element search wherein all records containing one or more key words are retrieved. In a rule-based search, both the number and order of the elements contained in the database records are important. Consider a database containing the three records (a,x,b), (a,z,b), and (b,(d,e),a). A request for all records containing "a" and "b" would retrieve all of the above records. However, a request for all "rules" of the form (a,b) would not be satisfied by any of the records, since each record contains 3 elements and the requested rule contains only two. A request for all rules of the form (a,?,b), where ? denotes a variable element which may be satisfied by any constant, sub-expression, or another variable, would retrieve the first two records, but not the third, since "a" and "b" appear in the wrong order in the third record. Hence even with the concept of a variable, a rule-based retrieval system cannot conveniently be used to select records based on the key elements in an unspecified order.

One problem encountered in constructing memory systems for use in database retrieval operations is the difficulty of constructing a system which may be efficiently used for both key word and rule-based searches. To perform a rule-based search on a system designed for key word searches, one must first select all the data records which contain the elements found in the problem.

These records are then further examined to determine which, if any, pertain to the problem in question. Those records which contain the wrong number of elements or in which the elements are in the wrong order must be discarded.

Another problem encountered in implementing artificial intelligence systems using presently available computer hardware is the time required to search a large database for records matching a particular query sequence. To be useful, such a system must contain a very large number of records. Since the time needed to search the database is proportional to the length of the database, as a system having a fixed searching speed becomes "smarter" through the addition of new information in the form of new rules, it also become slower. This problem can only be solved by increasing the searching speed of the system as the size of the database to be searched is increased.

In spite of the numerous improvements which have been made in integrated circuit technology, modern computers differ very little from the original Von Neumann designs. The classical Von Neumann machine consists of a central processing unit and a separate memory organized into words of fixed length. The processing unit fetches data from the memory, one word at a time by specifying the location of the desired word relative to the beginning of the memory. To perform the above search, a Von Neumann type central processing unit would sequentially retrieve each word of the database from the memory and would then compare it to each of the key words in the query sequence which are also stored in the memory.

Since there is a limit to the speed at which a single processing unit can run, Von Neumann type machines in practice are limited as to the size of the database that may be accessed. Even at speeds of 10 million compares per second, a Von Neumann machine would be hard pressed to search the contents of a library which contained, for example, only the law reporter series for the various jurisdictions in the United States.

In addition to its speed limitations, the Von Neumann type architecture also presents a number of limitations because of its inherent hardware dependence. In order to specify a memory address, a fixed number of address lines are used. A system with N address lines can address a memory of 2N words and no more. To increase the memory capacity beyond this limit, one must effectively increase the number of address lines. This involves both hardware and software alterations, since most systems specify a maximum memory size that the computer's instruction set is capable of addressing. Furthermore, if a portion of the memory is rendered inoperative by a malfunction of one of its components, it is difficult to transfer this storage to an undamaged segment of memory without reprogramming. As the size of the memory is increased in response to the need to store increased numbers of data records, the probability of such a malfunction in one component of the memory increases.

Finally, a large database search problem will require the use of only a small fraction of the instructions present in a conventional central processing unit. A typical central processing unit has literally hundreds of instructions that it is capable of executing, varying from input-/output instruction for dealing with the outside world to mathematics instructions for combining memory words which represent numbers. The database search problem requires at most 10 to 20 of these instructions. Hence the database search problem under-utilizes the instruction repertoire of the central processing unit.

The speed limitations of the central processing unit may be overcome to some degree by constructing a system having multiple central processing units, wherein each has access to the memory. However, this solution has its limitations. The number of central processing units that can share a given memory is ultimately limited by the time it takes each central processing unit to access the memory. If the memory bus must be dedicated to each central processing unit for 1/10th of the time, then no more than 10 central processing units can effectively share the same memory. Thus, replicating the central processing unit is not the best solution to the speed limitations of Von Neumann machines.

Even if one could effectively reduce the search time using replicated central processing units, one is still left with the limitations imposed by the hardware. Sooner or later one will want to expand the database beyond these hardware limitations, which is difficult to do in the Von Neumann type machines. Ideally, one would like to have a modular memory which could be added to a system whenever increases in the size of the database demand it, without the concomitant necessity of increasing the number of address lines. This ability to expand the memory will become increasingly more important in those artificial intelligence systems where one seeks to build a machine which is capable of acquiring and using ever increasing amounts of information.

SUMMARY OF THE INVENTION

The present invention consists of a memory system for storing and retrieving data sequences of symbols in response to a query sequence. Each of the sequences is made up of three types of symbols, constants, delimiters, and variables. A data sequence is retrieved in response to a query sequence if the two sequences can be made identical by replacing the variables in each sequence by constants or combinations of constants and delimiters, said combinations beginning and ending with a delimiter. This determination is made by carrying out a number of pairwise comparisons between symbols chosen from each data sequence and the corresponding query sequence symbols. Those data sequences which successfully pass each of the pairwise tests are retrieved.

The data sequences are stored in a memory array which consists of a plurality of slots, each such slot being used to store one symbol from a data sequence. Contiguous symbols in the data sequence are stored in contiguous slots in the memory array. The query sequence is preferably sent to the memory system one symbol at a time over a bus connecting the memory system to an external data processing system. Each query symbol is compared with all of the corresponding symbols in each of the data sequences before the next query symbol is received. Each data slot has associated with it a flag which indicates whether said slot is currently active. The symbol stored in each active slot is to be compared with the next query symbol received. These flags are initialized prior to the commencement of the pairwise comparisons to indicate that all slots are active. After each pairwise comparison, the flag associated with the slot used in the comparison is reset to the inactive state. Each successful pairwise comparison results in at least one slot associated with the data sequence containing the successfully compared symbol being set to the active state. Those data sequences which successfully pass each of the pairwise comparisons with the corresponding query sequence symbols contain at least one symbol which is stored in a slot in the active state. Sequences containing a symbol stored in a slot in the active state may be read out after the last query symbol is received and compared.

To reduce the time needed to search the memory for all data sequences corresponding to a given query sequence, multiple processing units are employed. The various pairwise comparisons are carried out by a plurality of logic circuits. The memory slots are divided into blocks or segments containing one or more slots per block. A logic circuit is connected to each block. Each logic circuit performs the various pairwise comparisons on those slots in the block to which it is connected.

In addition to carrying out rule-based searches, the memory system can also efficiently retrieve all records containing a specified list of key words. This is accomplished by including a special symbol, a gumpf symbol.

It is therefore an object of the present invention to provide an improved memory system for the storage and retrieval of rules based on the contents of said rules rather than based on their location in the memory.

It is a further object of the present invention to provide a memory system which may also be used for the retrieval of data records which contain one or more key words or elements.

It is a still further object of the present invention to reduce the time needed to retrieve the records corresponding to a given query sequence by employing replicated computing hardware to perform the search functions.

These and other objects of the present invention will become apparent from the following detailed description of the invention and the accompanying drawings.

BRIEF DESCRIPTION OF THE DRAWINGS

FIG. 1 is a schematic block diagram of a memory system according to the present invention.

FIG. 1(a) is a schematic block diagram of one of the slots shown in FIG. 1.

FIG. 2(a) illustrates the state of the memory at the beginning of the search. FIG. 2(b) illustrates the state of the memory after the contents thereof have been compared to the first query symbol. FIG. 2(c) illustrates the state of the memory after the contents thereof have been compared to the second query symbol. FIG. 2(d) illustrates the state of the memory after the contents thereof have been compared to the third query symbol.

FIG. 5(a) illustrates the state of the memory prior to comparing the contents thereof to the gumpf symbol.

FIG. 5(b) illustrates the state of the memory after the contents thereof have been compared to the gumpf symbol. FIG. 5(c) illustrates the state of the memory after the contents thereof have been compared to the query symbol following the gumpf symbol.

DETAILED DESCRIPTION OF THE INVENTION

Figure 2:
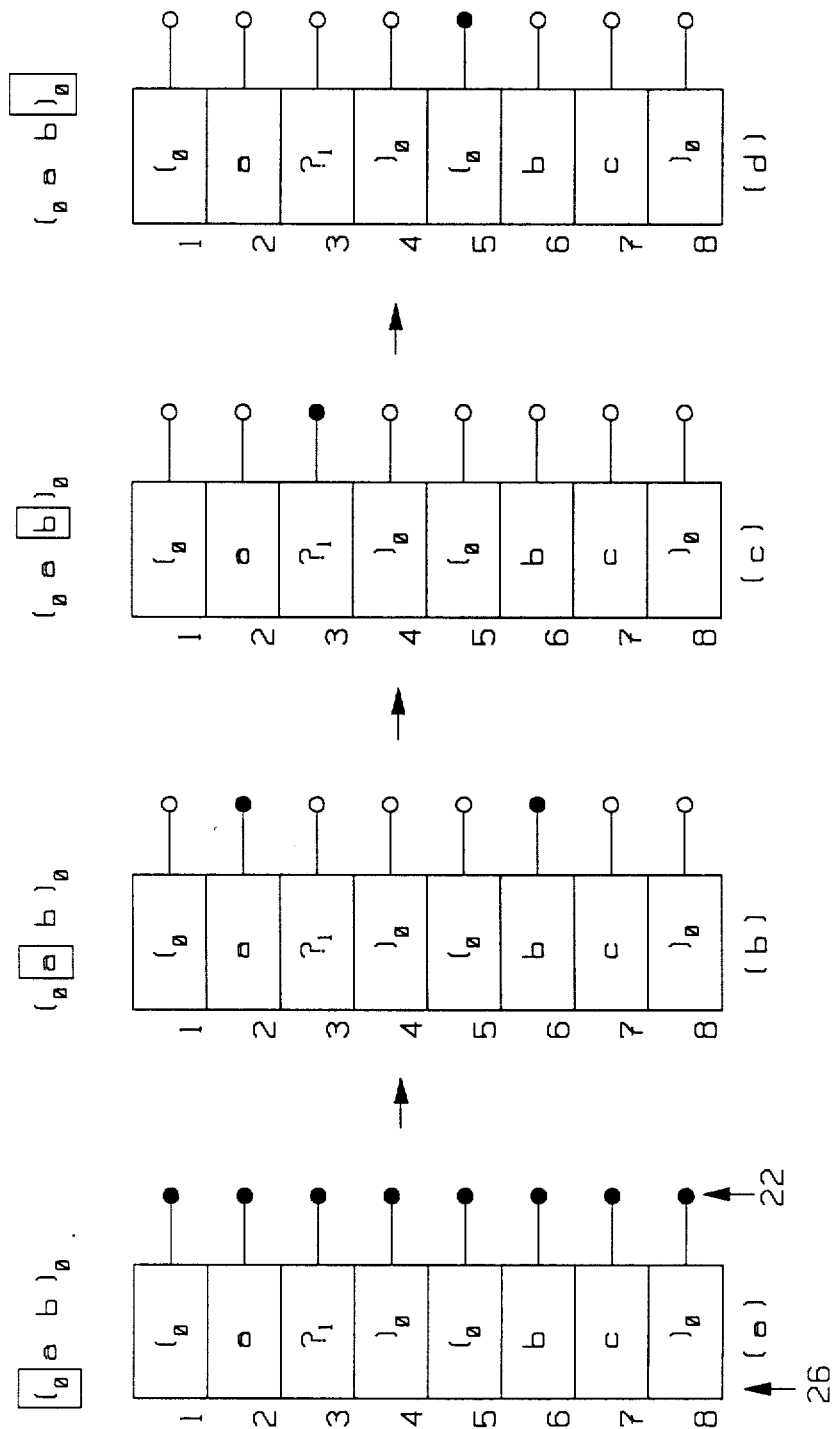
FIG. 2 illustrates the steps employed in an exemplary search of data stored in the memory system shown in FIG. 1.

In the memory system of the present invention, a rule is stored in the form of a string of symbols, referred to as a data sequence, which may contain three types of elements, delimiters, constants and variables. Delimiters, denoted by "(" and ")", are used to mark the boundary of data sequences and sub-expressions within data sequences. The string of symbols (a,b,(f,g),c) represents a data sequence having "a" as the first element, "b" as the second, the combination "f,g" as the third element and "c" as the fourth. Constants are elements having fixed values, e.g., "eats" and "hungry" in the above problem. A request for (a,b,c) can only be satisfied if all three of the constants a,b, and c are present in the order shown with no other elements between them. Variables, denoted by "?" or by "?x", where x is an optional name, may be satisfied by any constant or another variable. They constitute a short hand for "match anything". Thus a request to find all data sequences of the form (a,?,b) would return (a,x,b), (a,?,b), (a,z,b), (a,(d,e),b), etc.

In the above example, the memory would be searched for data sequences of the form "(if, (?x, eats), then, (?x, is, ?y))". A request for all data sequences of the form "(if, ?, then, ?)" would retrieve all "if then" data sequences including the one listed above.

Since the search time is proportional to the length of the database being searched, the search time may be reduced by breaking the memory that stores the database into several subunits, each with its own processing unit. This is equivalent to dividing the search task between a number of small Von Neumann machines, each with sufficient memory to hold the query sequence or list of key words used in the key element search and one or more words of the database. The fastest search with such a system would be realized with a memory which has one processing unit built into each word of memory. Then in one memory cycle, the memory could compare itself to a key word and identify each data sequence in which the key word appeared. The optimum ratio of database words to processing units will clearly depend on the complexity of the processing unit relative to that of the memory. Since the processing unit needs only a few instructions to carry out the search function, it can have a much simpler construction than a general purpose central processing unit. Consequently, a relatively high density of processing units is possible. This type of highly replicated modular structure is particularly well suited to modern VLSI integrated circuit fabrication techniques.

This type of replicated computer hardware is also well suited to the database search problem in that the processing time does not increase as the database size increases, since each unit of memory capacity carries its own searching capacity with it in the form of its built-in processing unit. Hence the computing capacity of the system expands as the database expands. Furthermore, the system's central processing unit, as opposed to that of the processing units which provide the search function in memory, has relatively little overhead in this type of design. It does not need to keep track of addresses or other data associated with the contents of the memory. It has only to send the query sequence to a memory unit made up of a number of modules with instructions as to where to store the results of the search.

A memory system according to the present invention is shown schematically at 10 in FIG. 1. It includes a receiving means 40 for receiving a query symbol coupled to the apparatus which consists of a receiving circuit 41 for connecting the apparatus to a bus 11 of conventional design and a buffer 12 for holding a query symbol. Said query symbol comprises one of the symbols in the query sequence being used to specify which stored data sequences are to be retrieved. A memory block 16 stores the data sequences of symbols which are to be retrieved in response to the query sequence. A comparing means 14, connected to the buffer 12 and the memory block 16, performs the comparison operations necessary to ascertain if a particular data sequence corresponds to the query sequence.

The memory block is divided into a plurality of slots 18, each of which being used to store a data sequence symbol. A typical slot 18 is shown in FIG. 1(a). Each slot includes a fixed number of one bit storage cells 17 and is divided into two groups, an identification group 24 and a data group 26. The identification group is used to specify the type of data stored in a slot, e.g., if it is a constant constant, variable, or delimiter. The data group is used to store the information pertaining to the particular symbol stored in the slot. For example, if the constant "a" were stored in a slot, the data group would contain the binary representation of "a" and the identification group would contain the code for a constant. Five additional one bit storage cells are associated with each data slot, a hold bit 20, a token 22, a delete bit 30, a read pointer bit 32, and a write pointer bit 34. Each of these storage cells may be in one of two states, either a set or a reset state. The use of each of these storage cells will be explained in detail below.

The buffer 12 likewise includes a plurality of one bit storage cells 17 and is divided into an identification group 43 and a data group 42. These groups serve the same functions as the corresponding groups in the slots 18. The five additional above mentioned one bit storage cells present in the slots 18 are not present in the buffer 12.

In the preferred embodiment, the number of bits in the data group of each slot is greater than 30. This provides sufficient space to specify over a billion different constants. The letters of the alphabet are merely used for illustrative purposes in the examples. In practice, a code would be assigned for each constant which would be either a word in the English language or an entire phrase or sentence. For example, in the above examples, the word "eats" could be represented by a single constant. A second constant could be used for the word "hungry". The correspondence between a particular code which is a number between 1 and a billion, and its associated English equivalent may be stored in a table, or the code could be chosen such that it specifies the English equivalent directly, i.e., the code could be a combination of 7 bit ASCII codes spelling the word in question. If a table is used, the table could be stored in some auxilliary storage, or it could be stored in the form of data sequences stored in the apparatus of the present invention. For example, if the constant representing "eats" were assigned the code 500, a data sequence of the form (500,#,e,a,t,s) could be stored in the present invention. To retrieve the English equivalent of the constant with code 500, one would search the memory of the present invention for sequences of the form (500, #, ... ). Here, # is a special code which would be used to distinguish such table sequences from the other data sequences.

The present invention retrieves all stored data sequences of symbols which correspond to a given query sequence. A retrieval operation consists of three steps. First, the apparatus is initialized as described below. Second, the query sequence to be used in the search is sent to the apparatus of the present invention on bus 11. Finally, those data sequences which corresponded to the query sequence are returned on bus 11 to the external data processing system which sent the query sequence to the apparatus of the present invention.

Each data sequence is tested against the query sequence in a number of pairwise comparisons involving one symbol from the query sequence and one symbol from the data sequence in question. The query sequence is sent to the apparatus of the present invention as an ordered list of symbols, one symbol at a time. All of the pairwise comparisons involving a given query symbol are carried out before the next query symbol is sent to the apparatus. Only those data sequences which passed the previous pairwise comparisons are tested against the query symbol currently coupled to the memory system.

The data symbols to be tested against the current query symbol are identified by use of the token 22. A token in the set state indicates that the symbol stored in the slot associated with that token is to be compared against the current query symbol. The comparing means 14 compares all symbols marked by a token in the set state against the current query symbol. After each pairwise comparison is completed, the comparing means 14 resets the token to the reset state If the data symbol tested matched the query symbol with which it was compared, the comparing means 14 sets the token of the next data symbol to be compared in the data sequence in question to the set state. Hereafter, a token described as being in the set or reset state will be referred to as set or reset token, respectively. Similarly, the operation of changing the state of the token to the set or reset state will be referred to as setting or resetting the token, respectively.

In addition to providing a means for indicating the next data symbol to be tested in each stored data sequence, when the token is in the set or active state the token also provides a means for marking those data sequences which have passed the previous pairwise comparisons with the query sequence. When the memory system is initialized prior to the start of the query sequence, the tokens of all the data slots are set. At each of the pairwise comparisons in which a data symbol in a given data sequence matches the query symbol, a new token is set in the data sequence in question. If the pairwise comparison was unsuccessful, no new token is set in the data sequence in question. Since the comparing means 14 resets the token of the data symbol, i.e. changes its state to an inactive state, used in the last comparison at the end of that comparison, a data sequence in which the pairwise comparison fails will no longer contain a slot with a set token. In a rule-based search, those sequences which did not successfully pass the previous pairwise comparisons will not contain a slot with a set token. Thus, the token also provides a means for marking those sequences which are to be retrieved in response to the query sequence.

In comparing a given data sequence to a query sequence in a rule-based search, the comparing means 14 executes a series of pairwise comparisons between a query sequence symbol and a corresponding symbol in the data sequence being compared. The first symbols to be compared are the first symbols in each sequence. The subsequent symbols to be compared will depend on the symbols compared in the previous comparison. If the previous comparison did not involve an open delimiter and a variable, the next query sequence symbol to be compared will be the next symbol following the query symbol used in the previous comparison, and the next data sequence symbol used will be the next symbol following the data sequence symbol used in the previous comparison. If a variable in one sequence is compared to an open delimiter in the other sequence, the next symbols to be compared are the one following the variable and the one following the closing delimiter corresponding to said open delimiter. This allows a variable in one sequence to be satisfied by an embedded sub-sequence of arbitrary length in the other sequence. For example, if the data sequence (a,?,x)

were compared to the query sequence (a,(k,m),y), the pairwise comparisons carried out by the comparing means 14 would be as follows. First, the "(" in the data sequence would be compared to the "(" in the query sequence. Second the "a" in the data sequence would be compared to the "a" in the query sequence. Third, the "?" in the data sequence would be compared to the "(" in the query sequence. Since the "(" marks the beginning of the sub-sequence "k,m", the next symbols to be compared will be the "y" following the ")" in the query sequence and the x following the "?" in the data sequence.

It should be noted that a sub-expression embedded in a data or query sequence may also contain one or more sub-sequences. Hence some means must be provided for ascertaining which closing delimiter, ")", corresponds to the given open delimiter, "(", which marks the beginning of the sequence or sub-sequence which must be "jumped". In the preferred embodiment, a label is associated with each corresponding pair of delimiters. When the comparing means 14 encounters a "(", it reads the associated label and then searches forward in the sequence in question until it encounters a ")" with the same label. For this system to operate successfully, the label used to mark a particular pair of delimiters may not be repeated within the sub-sequence marked by said pair of delimiters.

The preferred label is the level of nestedness of the sub-expression marked by the delimiters. Each data sequence, and the query sequence, begins and ends with a delimiter which is defined to be of level 0. A sub-sequence contained within a sequence of level n is assigned a level of n+1. Hence a sub-sequence of a data sequence has a nestedness label of 1. A sub-sequence of this sub-sequence has a nestedness level of 2, and so on. The nestedness level is stored with each open delimiter and its corresponding closing delimiter in the data group of the slot in which the delimiter is stored.

A variable contained within a sequence of nestedness n can only be matched against a sub-sequence of nestedness n+1. Hence, a label may also be associated with each variable indicating the level of nestedness of the sub-sequences which may be successfully matched against said variable. In the preferred embodiment, for reasons as described below each variable also has a label associated with it. This label is stored in the identification group of the slot in which the variable is stored and is equal to the level of nestedness of the sub-sequence it can match. The comparing means 14 actually uses this label as opposed to that stored with "(", ")" when a sub-expression which matches a variable is to be skipped.

A simple example of a rule-based search performed according to the present invention is shown in FIG. 2. The memory block shown has two data sequences stored in it, sequences (a,?) and (b,c). These sequences are stored respectively in slots 1-4 and 5-8. The query sequence being searched is (a,b). Each of the slots is numbered in FIG. 2 merely facilitate the discussion of this example.

At the beginning of the search, all of the tokens 22 are set, as indicated in FIG. 2(a) by the shaded circles. Each symbol of the query sequence is searched separately as follows. Each symbol stored in a slot having a set token is compared to the current element being searched in the query sequence which is shown in the box above the memory block. In the case of the first query element ($($, all the tokens are set, so all of the slots will be compared against "($". Slots 1 and 5 match. For all slots that did not match, the tokens are reset and no new tokens are set as indicated by the open circles. Finally, the tokens at slots 2 and 6 are set in response to the correct matches at slots 1 and 5 respectively. The process is now repeated for the second symbol, "a" of the query sequence. The status of the match tokens at the beginning of the second matching operation is shown in FIG. 2(b). Only slots 2 and 6 have set match tokens at this point. Hence only these slots will be compared against the query sequence element "a". Of these, only slot 2 matches. Hence, at the end of the second operation, there will only be one set token at slot 3 which resulted from the correct match at slot 2, as shown in FIG. 2(c). At the next stage of the match, slot 3 which is the only slot still having a set token, will be compared with query symbol "b". Since slot 3 contains a variable symbol, denoted by "$?_1$", it will match any constant in the query sequence. Hence the token at slot 3 will be reset and that at slot 4 will be set. At the next stage of the match, slot 4 will be compared to "$)_0$" in the query sequence. At the end of the query sequence match, set tokens will be present after all data sequences in memory which matched the query sequence, which in this example would be after the first data sequence (the only one that matches the query sequence), as shown in FIG. 2(d).

Figure 3:
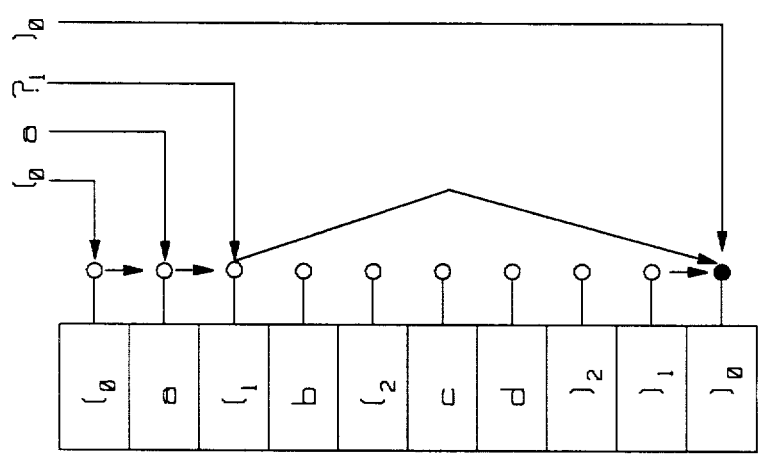
FIG. 3 illustrates the steps employed in a second exemplary search of data stored in the memory system shown in FIG. 1.

The method used by the comparing means 14 to "jump" around a sub-expression which is matched against a variable depends on whether the sub-expression was contained in the query sequence or in a data sequence. The case in which a variable in the query sequence is matched against a sub-expression in a data sequence is illustrated in FIG. 3. Here, the query sequence $(_0 a, ?_1)_0$ is compared to the data sequence $(_0 a, (_1 b (_2 c, d)_2)_1)_0$. When the $?_1$ in the query sequence is matched against the "$(_1$" in the data sequence, the comparing means 14 must search forward in the data sequence in question until it finds the corresponding "$)_1$" and set the token of the slot following the one containing the "$)_1$". This is accomplished in two steps. First, the token of the slot containing the "$)_1$" is set and the token of the slot containing the "$(_1$ reset". Special hardware for accomplishing this jump will be discussed in detail below. Second, the $?_1$ is compared to the "$)_1$", and since a variable matches any data symbol, the token of the following slot is set at the end of this comparison. In the preferred embodiment, this is done in a single step.

Figure 4:
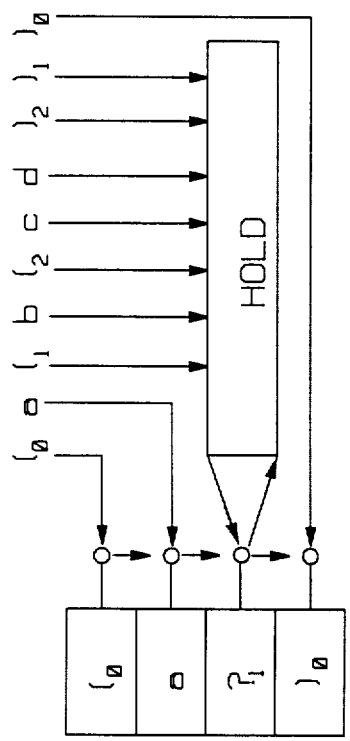
FIG. 4 illustrates the steps employed in a third exemplary search of data stored in the memory system shown in FIG. 1.

FIG. 4 illustrates the case in which the sub-sequence to be jumped is in the query sequence. Here, data sequence $(_0 a, ?_1)_0$ is compared to the query sequence $(_0 a, (_1 b, (_2 c, d)_2)_1)_0$. After the comparing means 14 matches the $?_1$ against the $(_1$ in the query sequence, it must wait until the corresponding "$)_1$" in the query sequence is coupled to the apparatus of the present invention before it can make the next comparison involving a data symbol in the data sequence containing the $?_1$. Other comparisons involving data sequence symbols from other data sequences can continue while the comparing means 14 waits for the "$)_1$". This wait state is implemented by setting the hold bit 20 associated with the slot containing the $?_1$. A set hold bit indicates that the slot is not yet ready to be compared to a query symbol. When the comparing means 14 compares a symbol in a slot with a set hold bit, it does nothing unless the query symbol is a closing delimiter with the same label as contained in the slot with the ? in question. In this case, once the "$)_1$" is coupled to the apparatus, comparing means 14 resets both the hold bit and the token and sets the token of the slot following the one containing the ?.

Several features have been included in the apparatus according to the present invention to facilitate searches based on key words only, as opposed to the rule-based searches described above. First, the query sequence does not have to begin with "(" or end with ")", although the stored data sequences must begin and end with ($_0$ and )$_0$, respectively. This enables one to search for all sequences containing a particular element "a" by setting all the tokens, matching with the single symbol query sequence "a", and then reading out all the data sequences which still contain at least one symbol stored in a slot having a set token.

If one wished to find all data sequences which contained "a" followed somewhere in the data sequence by "b", the above process could be repeated twice. First all data sequences containing "a" would be marked and stored in some auxiliary storage memory under the control of the central processing unit. Then all data sequences containing "b" would be marked and compared to those stored in the auxiliary storage. The ones common to both groups would be read out. Although this method would work, it is quite lengthy and could require a significant amount of auxiliary storage if a large number of data sequences contained the first symbol.

Figure 5:
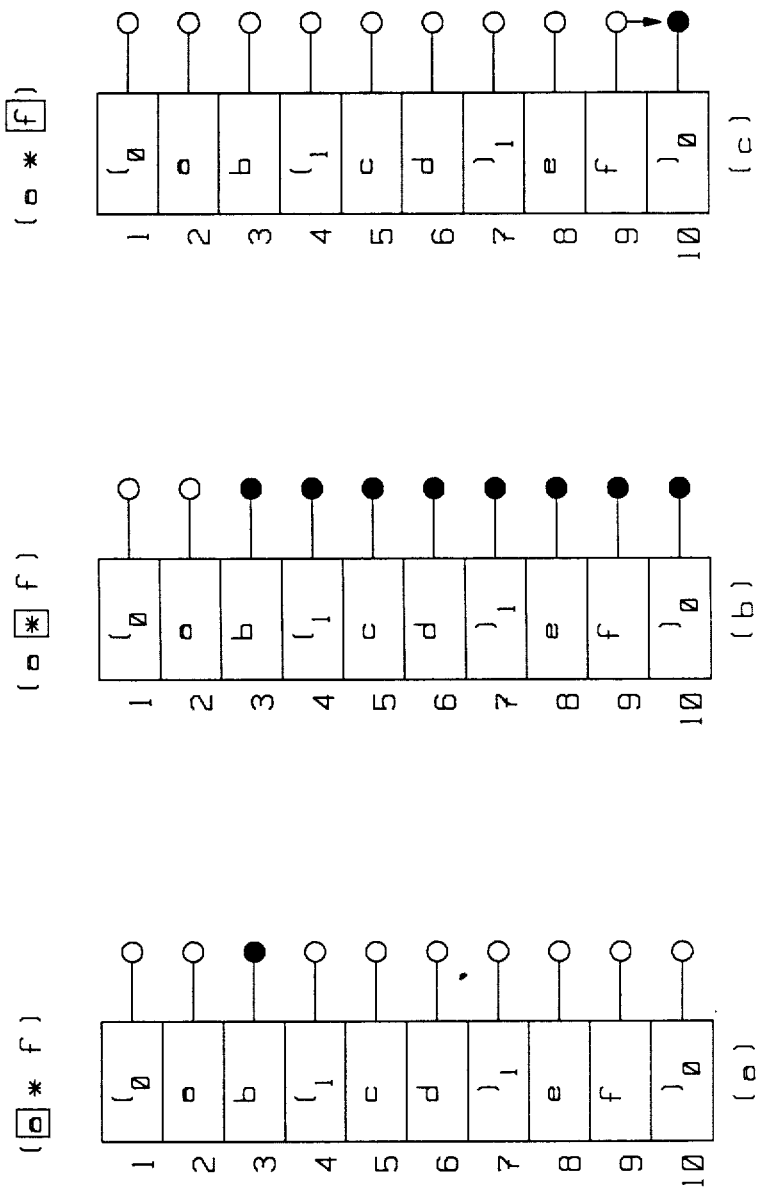
FIG. 5 illustrates the use of a gumpf symbol, denoted by the "*" element, to simplify key element searches.

To avoid this, a fourth type of symbol, a gumpf, denoted by a "*" symbol, has been defined. If the comparing means 14 encounters a * in the query sequence, all tokens between those currently set and the next )0 are set. This allows the matching processes to continue at any slot below the *. The operation of the gumpf is illustrated in FIG. 5. In the case illustrated in FIG. 5, the query sequence (a,*,f) is being matched to a data sequence, (a,b,(c,d),e,f) stored in the memory. After the match to the "a", a set token is present at slot 3 as illustrated in FIG. 5(a). After encountering the * in the query sequence, all tokens from the current one at slot 3 through the )₀ at slot 10 are set as illustrated in FIG. 5(b). Hence, when the "f" in the query sequence is searched next, slots 3 through 10 will be considered, not just slot 4. Since slot 9 contains an "f", the comparisons with the query sequence symbol "f" will result in the slot 10 token being set as illustrated in FIG. 5(c). Hence the query sequence (a,*,f) marks all data sequences which contain "a" followed by an "f" somewhere in the data sequence. Additional examples of the use of the gumpf symbol in a query sequence are discussed below.

A gumpf may also be included within a data sequence where it results in the data sequence containing said gumpf being selected if the portion of the data sequence preceding the gumpf matches the portion of the query sequence which precedes the query symbol which is compared to the gumpf by the comparing means 14. When any query symbol is compared to a gumpf, the hold flag of the slot containing the gumpf is set. This hold flag remains set until the apparatus of the present invention is reset or until an "exact" matching instruction is given. The exact matching instruction is explained below. In addition, after each comparison between the gumpf in this slot and any query symbol, the token in the slot following the one containing the gumpf is also set. This allows the comparisons to continue at the slot after that containing the gumpf at any time a query symbol matching the one contained in that slot is coupled to the memory.

Once the entire query sequence has been sent to the memory, the results must be read out. This is accomplished by marking the beginning of each data sequence which satisfied the query sequence and then reading out each marked data sequence. A token is used as the "mark". At the end of the matching, a set token appears somewhere in each data sequence that matched the query sequence or immediately after said data sequence. In the case of a "rule-based" match, the token is set just after the end of the data sequence. In the case of a "key element" search, it appears after the last data sequence symbol that matched. Preferably, instruction is provided which "jumps" these set tokens back to the beginning of the data sequences in which they appear, i.e., the token is moved back to the first (₀ which appears above each set token. This marks the beginning of each matched data sequence, which facilitates the read out of the sequence.

In the preferred embodiment, referring again to FIG. 1, data sequences are read from the apparatus of the present invention one symbol at a time over the bus 11 used to couple the query sequence to the apparatus of the present invention. The slot containing the symbol to be read is connected to the bus 11 by the comparing means 14 and the receiving means 41. The slot to be connected is specified by a read pointer bit 32. Only one read pointer bit may be set at any given time. The slot having this set bit is connected to the bus 11 by the comparing means 14 during read out. The position of the set bit within the memory block 16 may be altered by executing one of three instructions which are described in detail below. Similarly, in the preferred embodiment, data sequences are written into the apparatus of the present invention one symbol at a time from the bus 11. The slot which is to store the symbol communicated on the bus 11 is specified by a write pointer bit 34 which operates similarly to the read pointer bit 32 discussed above. During this write operation, which will be discussed in detail below, the slot having the set write pointer bit is connected to the bus 11 by the comparing means 14. The position of the set write pointer bit is altered by sending an appropriate write instruction to the apparatus.

Once a data sequence has been stored in the apparatus of the present invention, it may be deleted by setting the deleted bit 30 on each slot containing a symbol of the sequence in question. The comparing means 14 ignores all slots having set delete bits when it makes the pairwise comparisons between the query symbol and the symbols stored in the apparatus of the present invention.

Figure 6:
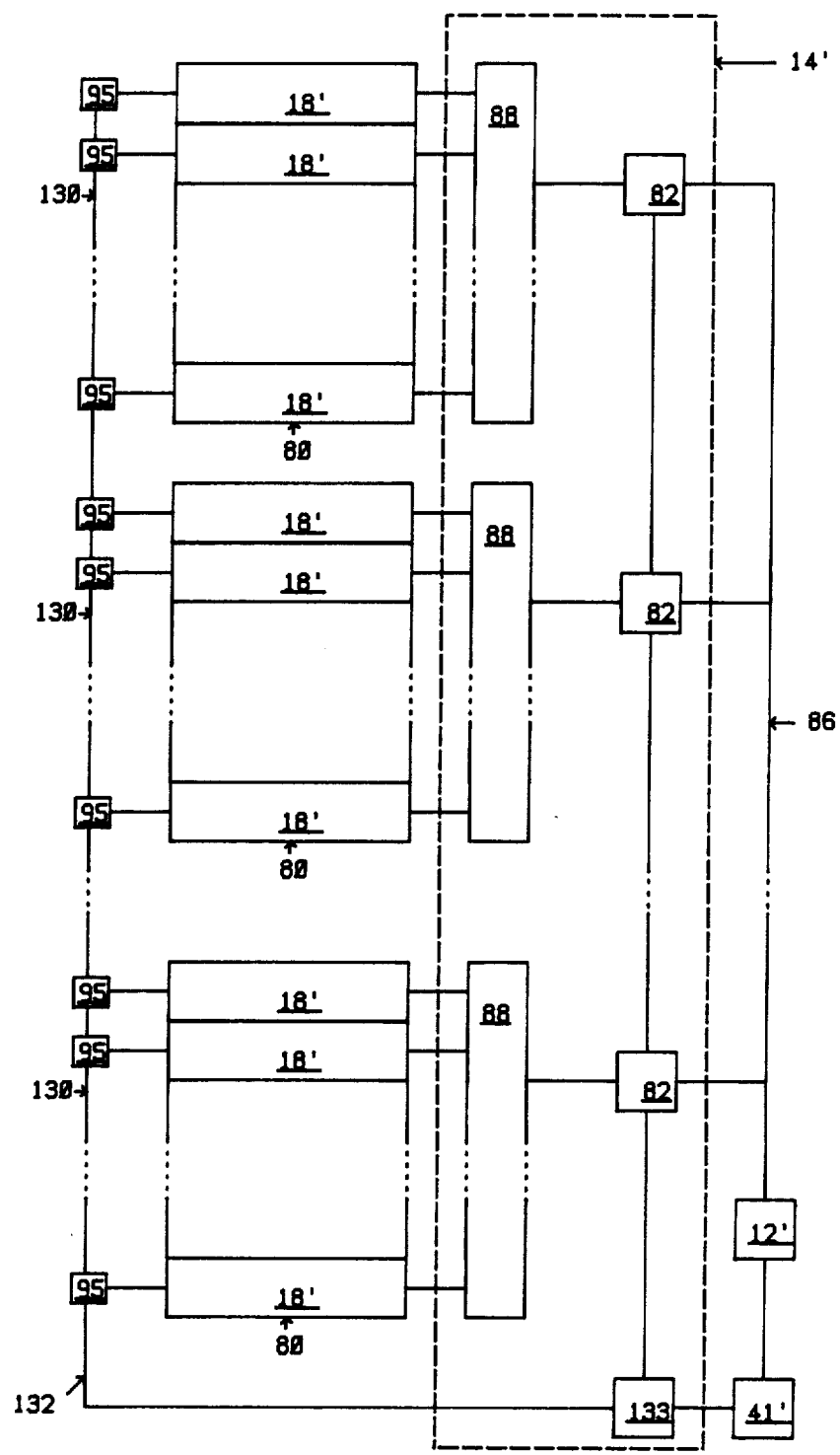
FIG. 6 is a schematic block diagram of a preferred embodiment of the present invention.

In order to reduce the time needed to find all the stored data sequences which correspond to a given query sequence, the memory block 16 is divided into a number of segments 80 as shown in FIG. 6. Each segment consists of one or more contiguous slots. The comparing means 14' includes a plurality of comparison circuits 82, each such circuit 82 being connected to one such segment through a conventional multiplexing circuit 88. Each comparison circuit is responsible for carrying out the pairwise comparisons between symbols stored in the memory segment to which it is connected and the query symbol which is currently coupled to the apparatus of the present invention and stored in query buffer 12'. The query symbol in question is communicated from buffer 12' to each of the comparison circuits on a query bus 86. When a new query symbol is coupled to the query bus 86, the receiving circuit 41' signals the comparison circuits on the bus 84. Each comparison circuit then cycles through the memory slots under its control and compares the symbol stored in each such slot in the active state with the query symbol. Since the individual comparison circuits work in parallel, the search time is reduced by a factor equal to the number of comparison circuits relative to a system with only one such circuit.

Each comparison circuit 82 is also connected by the bus 84 to the comparison circuits which perform the comparisons involving symbols stored in the segments 80 on either side of the segment connected to said circuit. The bus 84 provides a means by which one comparison circuit can cause a token to be set in a segment 80 adjacent to the one connected to it. When a comparison circuit 82 finds a stored symbol which matches the query symbol, it must set the token of a slot after the one containing said symbol. If this slot is located in the segment 80 adjacent to the one it controls, it signals the comparison circuit 82 which governs said adjacent segment to set the token in question.

Figure 7:
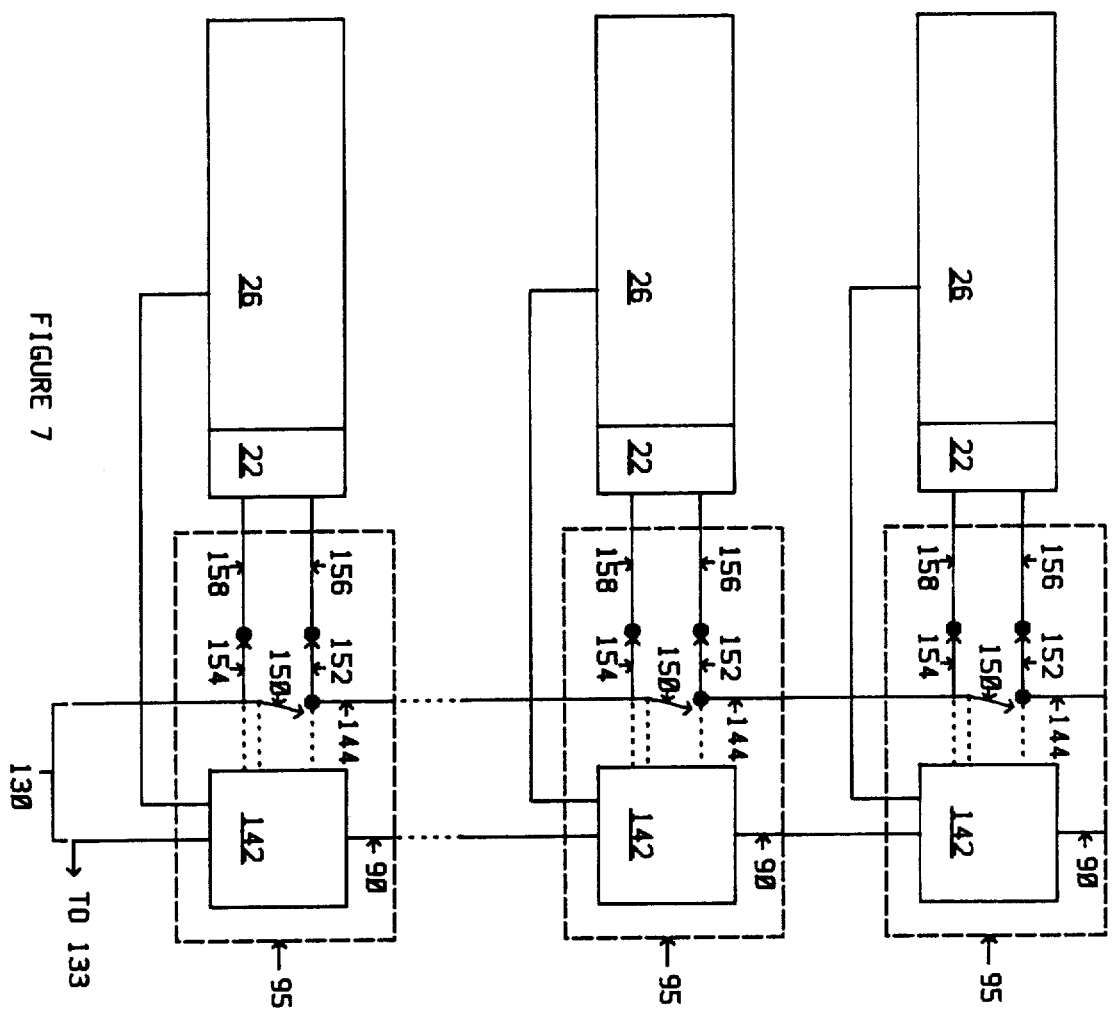
FIG. 7 is a schematic drawing of the "jump wire" circuitry employed in the preferred embodiment.

There are a number of applications listed above in which tokens must be transferred between non-adjacent slots, i.e., a first token is reset at one slot and a second token is set at a slot which is at least 2 slots after the first slot. For example, if the query sequence contains a ?$_x$ which is compared against a ($_x$, then the token must be jumped to the next slot following this one which contains the matching )$_x$ in the memory. In the preferred embodiment of the invention, this is accomplished by the use of a "jump wire" which is part of the comparing means 14 and which runs down the entire length of the memory block as shown at 132 in FIG. 6. Each of the tokens is connected to a bus 130 by a switching circuit 95. A more detailed schematic of this circuitry is shown in FIG. 7. Each switching circuit 95 includes three switches, shown at 150, 152, and 154, and a control circuit 142. The control circuits 142 communicate on a control bus 90. Breaks in a "jump wire" 144 may be introduced at any slot by opening an appropriate "break" switch 150.

Each token has an input terminal 156 and an output terminal 158. Both the input and output terminals of each token may be connected to the jump wire, either above or below the break. For example, to connect the input terminal 156 to the jump wire below a break, switch 154 is connected to terminal 156. To connect the input terminal above the break, switch 152 is connect to terminal 156. A signal on the input of a token results in it being set. The output terminal may similarly be connected either above or below a break. The jump wire provides a means for connecting the output terminal of a specified slot to the input terminal of one one or more specified slots. The operation of the jump wire is coordinated by an interface circuit 133 which is under the control of the receiving circuit 41.

The interface circuit 133 communicates the delimiter labels at which breaks in the jump wire are to be made and the combination of switch closures to be made at each set token and break to the switching circuits 95. It receives this information from one or more of the comparison circuits 82 and the receiving circuit 41' on the bus 84. This circuit is a logic circuit of conventional design.

When a $?_x$ is matched against a ($_x$ in the memory, breaks are introduced at all slots having )$_x$ by communicating a command on the control bus 90 to the control circuits 142 which open the break switches 150 at all locations having a )$_x$. Breaks are also introduced at slots having set tokens by opening the break switches 150 at these locations. The token output terminals from the slots having set tokens are connected to the jump wire 144 below the breaks by connecting switches 154 to output terminals 158. The token input terminals at slots having a )$_x$ are connected to the jump wire 144 above the breaks by connecting switches 152 to input terminals 156. It should be noted that because of the use of breaks in the jump wire 144, a single wire can be used therefor throughout the memory. Since a direct connection is made between the two slots which are acting as the source and destination of the token, the transfer takes place in a time which is independent of the number of slots jumped. Hence it does not interfere with matches that are taking place at other memory slots which are of the simple constant-constant type or in which the token is moved down a different number of slots.

The jump wire is also used in the case of a * in the query sequence. Here, the breaks are introduced at the token specified above, and at slots containing )$_0$. All slots in between have their token inputs connected to the line which results in all of the tokens between the set token and the )$_0$ being set.

Finally, the instruction that moves the set token to the beginning of the data sequence in which it appears also uses the jump wire 144. Here, the breaks are introduced at the slot having the set token and all slots containing a ($_0$. However, in this case, the output of the set token is connected to a point above the break in the jump wire 144 and input of the token at he slot containing the ($_0$ is connected to a point below the breaks.

Figure 8:
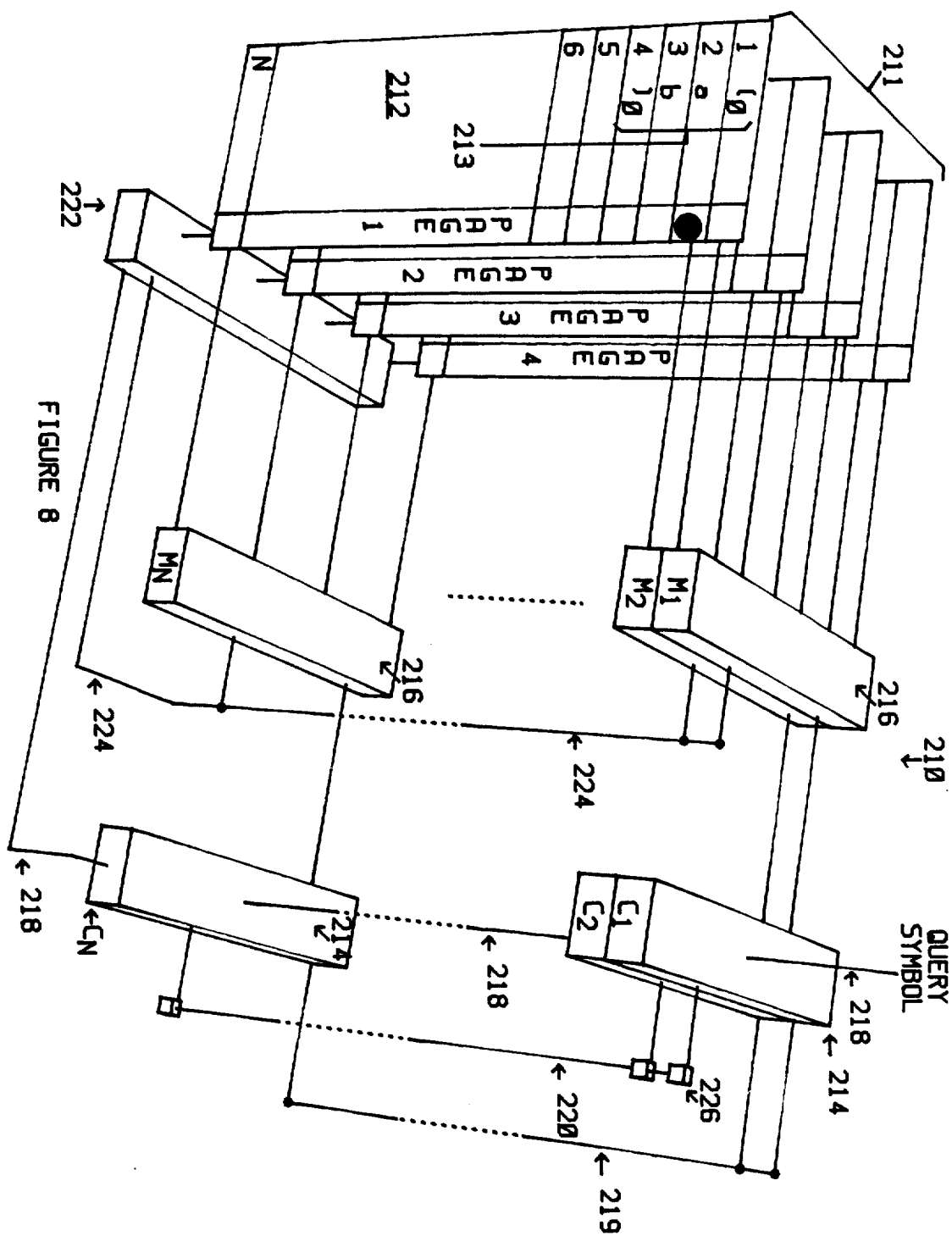
FIG. 8 illustrates a second preferred embodiment of the present invention.

A second preferred embodiment of the present invention is shown at 210 in FIG. 8. This embodiment allows a significant reduction in the time needed to search the memory for data sequences which match a particular query sequence when very few such data sequences exist. This is accomplished by skipping portions of the memory which do not contain any set tokens. In this preferred embodiment, the memory block 211 being used to store the data sequence symbols is divided into a plurality of pages of which 212 is typical. In the embodiment shown in FIG. 8, there are four pages. Embodiments in which there are different numbers of pages will be apparent to those skilled in the art. Each page 212 has N slots. Each such slot is identical to that described with reference to FIG. 1(a). A given data sequence is stored in a contiguous block of slots as shown at 213. For the purpose of storing data sequence symbols, the page boundaries are ignored. The first data sequence symbol of the first data sequence being stored in the first slot on the first page, the second data sequence symbol in the second slot on the first page, and so on. If there are not enough slots on a given page to accommodate a data sequence, then the sequence is continued onto the next page.

The comparisons between the data sequence symbols stored in the memory block 211 and a given query sequence symbol are made by a plurality of comparison circuits 214. There are N such comparison circuits. Each comparison circuit performs the relevant comparisons between a data sequence symbol stored in a given slot on each page 212 and the query sequence symbol currently coupled to the apparatus of the present invention. The first comparison circuit compares the data sequence symbols stored in the first slot of each page with the query sequence symbol communicated on bus 218. The second comparison circuit compares the data sequence symbols stored in the second slot on each page with said query sequence symbol and so on. The query sequence symbol currently being compared with the data sequence symbols stored in the memory block 211 is communicated to each comparison circuit 214 on a bus 218.

At a given time, only one page of the memory block 211 is active with this comparison process. This page is connected to the comparison circuits 214 by a plurality of multiplexing circuits 216. There is one such multiplexing circuit 216 for each comparison circuit 214. All of the slots on a given page are compared with the current query sequence symbol before going on to the next page.

If the data sequence symbol stored in the Ith slot on the currently active page matches the query sequence symbol then the Ith comparison circuit 214 signals the (I+1)th comparison circuit to set the token of the (I+1)th slot. This signal is sent on the bus 219 connecting the comparison circuits 214. If I=N, i.e., the last slot in the active page matches the query sequence symbol, then the Nth comparison circuit signals the first comparison circuit to set the first token of the next page when that page becomes active.

If a variable query sequence symbol is coupled to bus 218, a jump around a sub-expression in one or more of the data sequences stored in memory block 211 may be necessary. If a jump is indicated by the comparison circuit 214, i.e., a variable query sequence symbol is matched to an open delimiter, this jump is performed by signals on a jump wire 220 which is connected to each of the comparison circuits 214 by two switches 226.

This jump wire operates in a manner analogous to that shown in FIG. 7. The jump wire circuitry is shown in more detail in FIG. 9 at 230.

Figure 9:
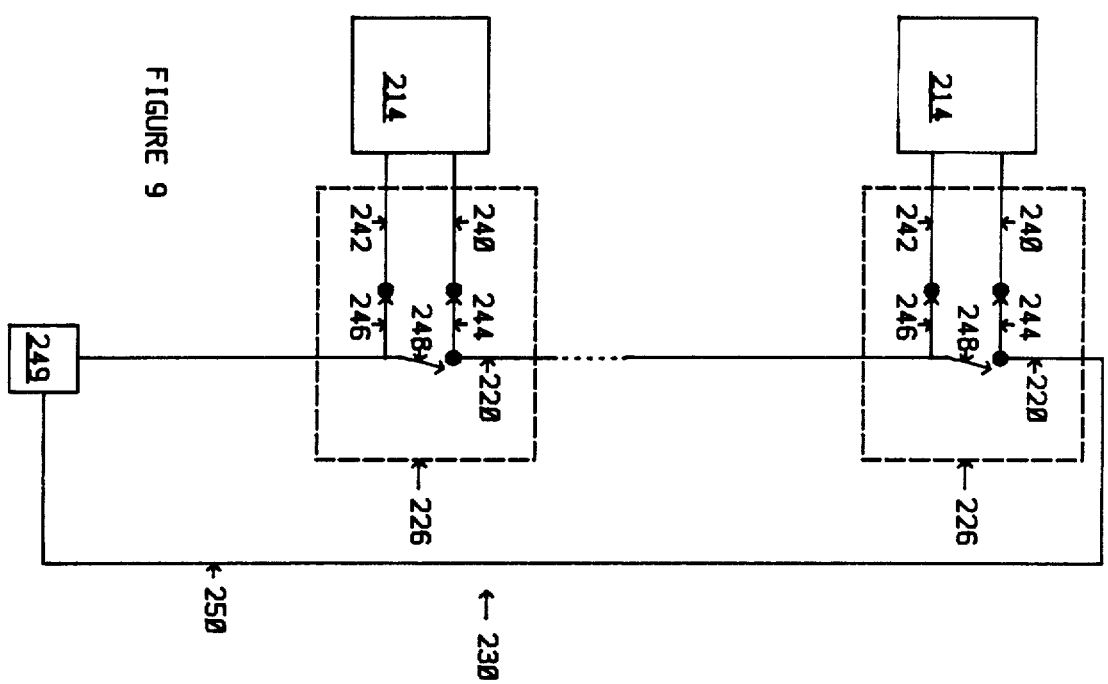
FIG. 9 illustrates the jump wire used in the embodiment shown in FIG. 8.

Referring now to FIG. 9, each comparison circuit 214 is connected to the jump wire 220 by an input terminal 240 and an output terminal 242. A signal on input terminal 240 causes the comparison circuit 214 to set the token of the slot currently connected to it. A signal is present on the output terminal 242 if the token in the slot currently connected to the comparison circuit 214 is set. Each comparison circuit 214 controls three switches, switches 244, 246, and 248, which are associated with the jump wire 220. Switch 248 enables a break in the jump wire to be created at the location of the comparison circuit 214 controlling it. Switch 242 is used to connect either the input terminal 240 or the output terminal 242 to the jump wire 220 above said break. Switch 244 is used to connect either the input terminal 240 or the output terminal 242 to the jump wire 220 below said break.

These switches are used to "jump" a token between slots. For example, When a $?_x$ is matched against a $(_x$, each comparison circuit which is currently connected to a slot in which $)_x$ is stored causes a break to be introduced into the jump wire at its location by opening the switch 248 under its control. Each comparison circuit 214 also checks to see if it is currently connected to a slot having either a $(_x$ or a $)_x$. If it is connected to a slot having a $(_x$, it connects its output terminal 242 to the jump wire 220 below the switch 248 which is under its control, using the corresponding switch 246. If it is connected to a slot having a $)_x$, it connects its input terminal 240 to the jump wire 220 above the switch 248 which it controls, using the corresponding switch 246. The signal on the jump wire 220 at the last comparison circuit is stored in a storage circuit 249 which is connected to the jump wire 220 at the first comparison circuit 214 by a line 250. This storage circuit allows a jump to continue on to the next page when that page becomes active.

If a jump requires that a token be set on a page following the currently active page, the jump wire will have the appropriate signal present at the beginning of the comparisons for that page when it becomes active.

If the current query sequence symbol is a "*", breaks are introduced at the location of each set token and at the location of each $)_0$. All slots having a set token have their output token connected to the jump wire 220 through the corresponding switch 246. All slots which do not have a set token have their input terminals 240 attached to the jump wire by switches 244.

A set token can be moved to the beginning of the data sequence in which it appears by introducing breaks in the jump wire 220 at all locations in which a $(_0$ appears. All locations having a $(_0$ have their input terminals 240 connected to the jump wire 220 by switches 246. All locations having set tokens have their output terminals 242 connected to the jump wire by switches 244.

A significant increase in the matching speed can be obtained by bypassing memory pages which do not have a set token anywhere on them. Referring again to FIG. 8, the multiplexing circuits 212 are controlled by a multiplexing control circuit 222 which specifies the page 212 which is currently active by signals on bus 224. A comparison cycle starts when a new query sequence symbol is coupled to the apparatus of the present invention. As described in greater detail below, the multiplexing control circuit 222 examines the tokens on each page 212 of the memory block 211 to determine if there is at least one set token on said page. If there is not, multiplexing control circuit 222 marks that page for skipping. The multiplexing control circuit 222 then causes the multiplexing circuits 216 to connect the first page which is not to be skipped to the comparison circuits 214. At the end of the comparisons involving memory slots on this page, the multiplexing control circuit 222 causes the next page which has at least one set token to be connected to the comparison circuits 214 by the multiplexing circuits 216. This is repeated until the comparisons between the current query sequence symbol and the data sequence symbols stored on the last page have been completed.

There are two special cases in which a page which would have been bypassed is selected for comparisons despite of the fact that it had no set tokens at the beginning of the comparison cycle. In the first of these cases, the query sequence symbol is a $?_x$. Since this signals a possible jump condition which may result in a token on any of the pages being set, all the pages are enabled for comparisons. In the second case, the last slot of the current page is successfully matched against the current query sequence symbol. Here a token must be passed on to the first slot of the next page. Hence, the next page is enabled for comparisons even if it currently has no set tokens.

Figure 10:
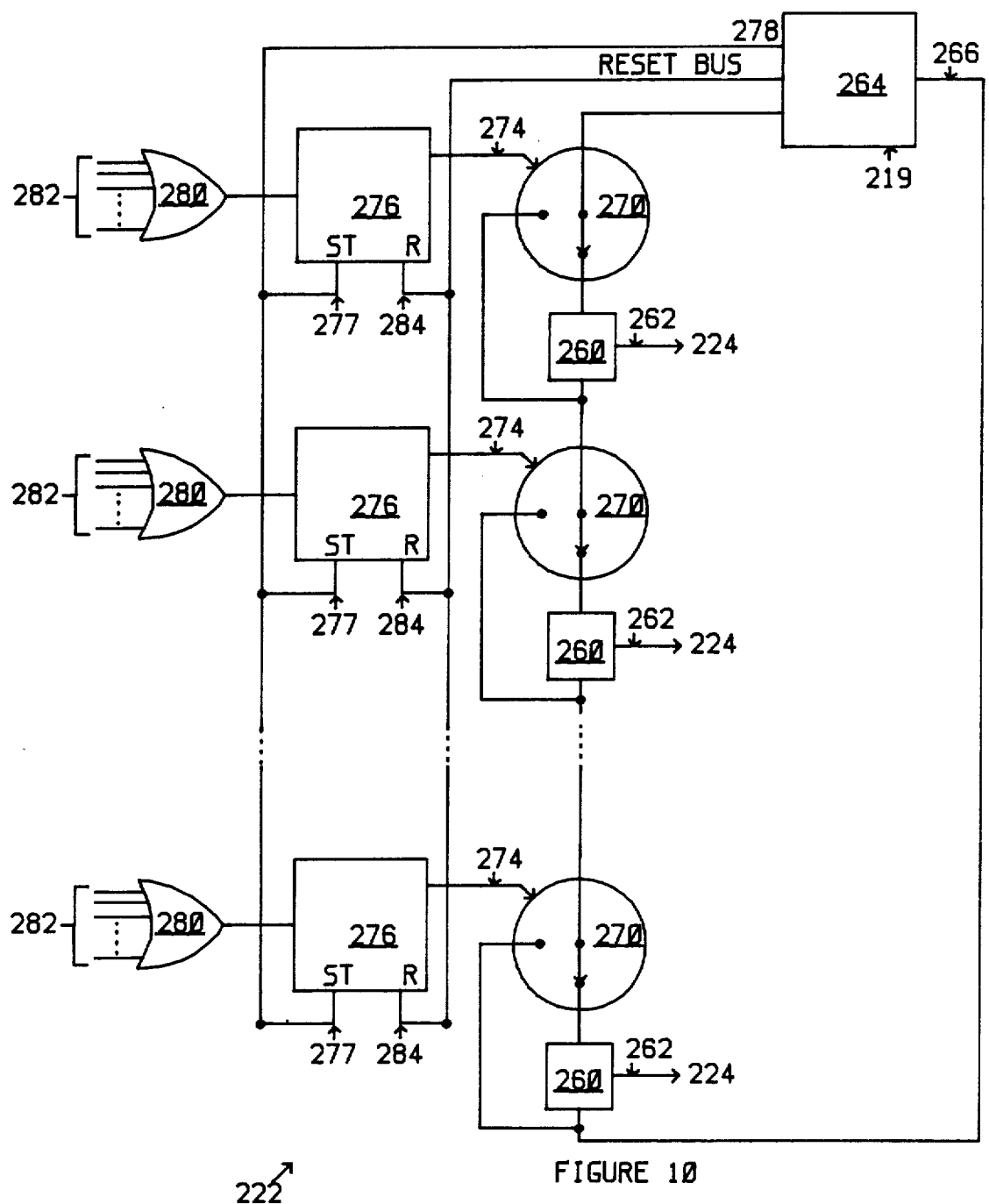
FIG. 10 is a detailed illustration of the multiplexing control circuit shown in FIG. 8.

The multiplexing control circuit 222 is shown in more detail in FIG. 10. The multiplexing control circuit 222 is a modified shift register having one binary memory cell 260 for each page. This shift register in combination with said multiplexing circuits provides a means for specifying a particular memory page. Only one of the memory cells 260 contains a "1" at a given time. Each memory cell 260 has an output terminal 262 which is connected to a corresponding gate in each of the multiplexing circuits 216 by a line of bus 224. When a memory cell 260 contains a "1", the corresponding memory page 212 of the memory block 211 is connected to the comparison circuits 214 by the multiplexing circuits 216. Successive pages in the memory block 211 are so connected by shifting the contents of each memory cell 260 to a memory cell in the shift register chain following said memory cell. When the control circuit 264 receives the "1" back on line 266, the comparison cycle has been completed.

Each memory cell 260 is connected in series with a routing switch 270. Each routing switch 270 allows the memory cell 260 following it to be "cut out" of the shift register path thus preventing that page from being specified for connection to the comparison circuits 214. Each routing switch 270 is controlled by signals on a control terminal 274. This control terminal is connected to the output of a latch 276. Each latch 276 provides a means for enabling comparisons on the corresponding memory page. Latch 276 is set at the beginning of the comparison cycle in response to storage control signals from the control circuit 264 which are coupled to a storage control terminal 277 on each latch 276. The data stored in each latch 276 is controlled by the output of an OR circuit 280 whose inputs 282 are connected to the tokens in the corresponding page 212 in the memory block 211. Latch 276 in turn sets the state of the switch 270 connected to it. If no tokens are set on a given page at the beginning of the comparison cycle, the latch 276 corresponding to that page will be set so as to cause the corresponding memory cell 260 to be bypassed. Hence, each latch specifies one of two possible states for the corresponding memory page. In the first state, the corresponding memory page is enabled; and will be selected for connection to the comparison circuits at the appropriate point in the comparison cycle. In this second state, it is "cut-out" of the memory.

Pages marked for "cut-out" are reactivated by resetting the corresponding latch 276 if either of the two cases discussed above are sensed by the control circuit 264. Each of the latches 276 may be separately reset by a reset signal coupled to a reset terminal 284 on each latch 276. Each said reset terminal 284 is connected to the reset bus of control circuit 264. When reset, a latch 276 causes the corresponding switch 270 to include the corresponding memory cell 260 in the shift register chain. When a variable query sequence symbol is connected to the apparatus of the present invention, the control circuit 264 causes each latch 276 to be so reset.

The control circuit 264 also monitors the output of the last comparison circuit 214 which is present on bus 219 connected to it. If this output is a signal indicating that the first token on the next page is to be set, the control circuit resets the latch corresponding to the memory cell 260 following the one currently having a "1" stored therein. Thus, pages marked for cut-out are reactivated if they are about to receive a set token.

In the preferred embodiment, the comparing means 14 responds to thirteen instructions which may be divided into five classes, initialization, matching, deletion, input and output, and garbage collection. All of the operations performed by the apparatus of the present invention are specified by sending one or more of these instructions to the comparing means 14 on the bus 11. Each instruction consists of an operation code which specifies the instruction and a query symbol, when appropriate. There are four initialization instructions. The first, denoted by EMP, "empties" the memory block 16 by causing the delete bit 30 to be set in every slot. The second, denoted by RWT, sets the write pointer bits 34 to specify the first slot in the memory block. The third, denoted by RRD, sets the read pointer bits 32 to specify the first slot in the memory block. The fourth, denoted by CLM, sets all of the tokens 22 and resets the hold bits 20. This latter instruction initializes the memory system for a new retrieval operation.

There are two matching instructions, referred to as "exact matching" and "non-exact matching". The exact matching instruction, denoted by EXM, requires the query symbol contained in the instruction to exactly match the symbol stored in the slot being compared to it, in which case the token of the slot following the one compared to the query symbol is set. Here, a ? in the query sequence will only be considered to match another ? in the memory slot, i.e., ? in the query sequence does not match an embedded sub-expression in the memory or even a constant in the memory. This instruction is primarily used as a precursor to the deletion instruction discussed below.

In non-exact matching denoted by NEM, the action taken by the comparing means 14 depends on the status of the hold bit and token of the slot being compared to the query symbol contained in the instruction. If the token is not set, no action is taken. For the remainder of this discussion, assume the token is set. If the identification group 24 of the slot being compared indicates that the slot contains a constant and the query symbol identification group indicates that the query symbol also is a constant, the comparing means 14 the data group 26 of the slot with the data group of the query symbol. If a match was present, the memory token for the next slot is set and the token for this slot is reset. Similarly, if the identification group indicates a delimiter of with a label of x and the query symbol identification group also indicates the same delimiter with the same label, the next token is set and the present one reset.

If the identification group of the slot indicates a variable with a label of "x", the action taken will depend on the status of the hold bit 20 as well as the query symbol identification group. If the hold bit is not set, there are three cases to consider, i.e., the query symbol identification group indicates that the query symbol is a constant, a variable, or a delimiter. The first two cases result in the next token being set and the current one being reset. A delimiter with a label of x results in the hold bit being set.

If the hold bit is set, there are again three possibilities for the query symbol being compared, a constant, a variable, or a delimiter. If the identification group indicates a variable or a constant, no action is taken. If the query symbol identification group indicates a closed delimiter, its label is compared to that of the variable stored in the slot. If the labels do not match, no action is taken. If the labels match, the hold bit is reset, the next token in the data sequence is set and the current token is reset.

If the query symbol identification group indicates a variable, the output to the next stage will depend on the slot identification group. If the slot identification group indicates a variable or constant, the next token in the data sequence will be set and the current token reset. If the identification group indicates an open delimiter with a label of "x", the token will be "transferred" to the slot containing the corresponding closing delimiter with a label of x by resetting the token of the current slot and setting the token of the slot containing the delimiter in question. The token of that slot will then be reset and the token of the slot following it will be reset. This is accomplished by connecting the token output of the set token at the slot containing the $(_x$ with the token input logic for the token at the slot containing the $)_x$ using the jump wire as explained above.

If the query sequence element is a "*", the tokens of all slots between any set tokens and the end of the data sequences in which they appear are set. This is accomplished by connecting the token output of the slots with set tokens to the jump wire and connecting all the token inputs of the slots between the set token and the next $)_0$ to the jump wire with breaks introduced at the locations marked by $)_0$.

If the slot containing a "*" has its token set, then the comparing means 14 will also set the hold bit 20. So long as the hold bit is set at a slot containing a "*", the comparing means 14 will set the token of the slot following the one containing the * after each match.

All data sequences which match a given query sequence are identified by sending a sequence of NEM instructions with one query symbol in each instruction. At the end of the query sequence, a set token appears after each data sequence which matched the query sequence. The token must be moved back to the beginning of the data sequence in question before the data sequence may be read out. To accomplish this, an instruction, denoted by TBK, is provided to move each set token back to the first "$(_0$ encountered above it. This is accomplished using the jump wire described above. Breaks are introduced at all locations with $(_0$ and the token is then jumped backwards to the next slot containing a $(_0$ by connecting the token output of the set token and the token inputs of all slots containing $(_0$ to the jump wire.

There are 4 instructions for inputting and outputing data sequences. There are three instructions for reading, move read-pointer forward and backward, and read data. The read pointer forward and backward instructions, denoted by RFD and RBD, respectively, result in the read pointer being positioned to the first set token encountered when the pointer is moved from its current slot either forward or backward, respectively. The read data instruction, denoted by RDS, places the contents of the slot currently marked by the read pointer on the bus 11 for reading by the external data processing system. The read pointer is advanced one slot after each read data instruction. When the read pointer reaches the end of the memory block, a signal indicating this is sent to the external data processing system on the bus 11.

Hence to read out all data sequences which matched a given query sequence, one would reset the read pointer to the first slot in the memory using the RRD initialization instruction. Then the pointer would be advanced to the first matching data sequence using the RFD instruction. Next, the data sequence in question would be read out one symbol at a time using a series of RDS instructions. When the $)_0$ marking the end of the data sequence is read out, a new RFD instruction would be given, to position the read pointer to the next data sequence that matched. The read out sequence described above would then be repeated for this next sequence. When a RFD instruction or a RDS instruction signals that the end of the memory block has been reached, the readout is completed.

There is only one write instruction. The write pointer is always positioned at the first free slot after the stored data sequences. The write instruction copies the data on the bus 11 into this slot and then advances the write pointer one slot. If the write pointer reaches the end of the memory block, a signal is sent to the external data processing system on bus 11. The garbage collection instruction described below must then be executed to make room for new data.

To load the memory block with data sequences, it is first emptied and the write pointer is set to the first slot in the memory block using the appropriate initialization instructions. Each data sequence is sent to the apparatus of the present invention one symbol at a time, each symbol being contained in a write instruction. At the end of the write instructions, the stored data sequences will be located in a contiguous block of memory slots starting with the first slot of the memory block 16. The write pointer will be set at the first free slot after the stored data sequences.

The memory supports a delete instruction which is used to set all the delete bits in slots which are to be ignored in the matching process and later deleted using the garbage collection instruction described below. The delete instruction results in all the delete bits being set between any set token and the beginning of the data sequence in which it is set, i.e., between a set token and the first $(_0$ above it. To be sure that the entire data sequence is marked for deletion, the match token must be set at the end of the data sequence to be deleted.

To delete a given data sequence, one first searches the memory for all sequences which match that sequence using the EXM instruction. This will leave the sequence in question with a set token just after the slot containing the $)_0$ marking the end of the sequence. The delete instruction can then be given which will result in the desired sequence having all of the slots in which it is stored marked for deletion. These slots will be ignored in subsequent operations. To regain this space for the storage of additional data sequences, the garbage collection instruction described below must be used.

The garbage collection instruction copies the contents of the memory block 16 onto itself in a manner in which any free space in the form of deleted data sequences is moved to a location after the stored data sequences where it will be available for the storage of new data sequences. Before the garbage collection instruction may be executed, the read and write pointers must be repositioned to the top of the memory array using the appropriate initialization instructions. The garbage collection instruction causes the memory to alternate between reading the slot marked by the read pointer and writing it back into the slot marked by the write pointer until the read pointer reaches the end of the memory and the process ends. Although the read pointer is advanced at the end of each read-write cycle, the write pointer is only advanced when the symbol written back does not have its delete bit set. This results in the data stored in deleted slots being replaced by data from non-deleted slots.

These 13 instructions together with the * character provide a means of searching both in the rule-based mode and the key element mode. A rule-based search using the NEM instruction is performed as follow. The memory is first reset using CLM. The query sequence specifying the data sequences to be retrieved is then sent to the memory one symbol at a time using the NEM instruction with each symbol. After the last symbol has been sent, the tokens are repositioned to the start of the data sequences satisfying the query sequence using the TBK instruction. To read out the selected data sequences, the pointer is first set to the top of the memory using RRD. It is then advanced to the first selected data sequence (i.e., the first data sequence with a set token) using RFD. Each symbol of this data sequence is then read, one symbol at a time using RDS until a $)_0$ is read, indicating the end of the data sequence. The pointer is then moved to the next data sequence to be read using RFD, and the process is repeated until the read pointer reaches the end of the memory block 16 as indicated by a signal on the bus 11.

Key element searches also begin by resetting the memory with CLM and the results are read out in the same manner as the rule-based searches. In the following examples, the CLM and read out procedures are omitted.

Example 1—find all data sequences containing x and y in that order.
  EXM x
  NEM *
  EXM y Example 2—find all data sequences with x and y in any order.
  EXM x
  TBK
  NEM *
  EXM y The sequence of instructions TBK followed by NEM * sets all tokens in a data sequence having at least one set token. Thus each data sequence with "x" is re-initialized for the search for "y".

It should be noted that in many searches, no data sequences are present which satisfy the query sequence.

This is often obvious after only the first few symbols have been searched, there are no set tokens remaining after the first few symbols are searched. In order to save search time, a signal is coupled out on the bus 11 by the apparatus which indicates that no tokens remain set. This allows the external data processing system to abort the remainder of the search and thus save processing time.

The preferred embodiment employs a memory block which may be both read and written for storing the data sequences. It will be obvious to those skilled in the art that a system employing a read only memory may also be constructed. Here, the identification and data groups would be constructed from read only memory devices while the five one bit storage cells associated with each slot would be constructed from read/write memory elements. Such a system would be useful for applications involving a fixed database.

While various embodiments of the invention have been discussed herein, it will be appreciated that various changes and modifications may be made without departing from the scope of the present invention.

What is claimed is:

1. A memory system for the storage and retrieval of data sequences of symbols in response to a query sequence of one or more symbols comprising:

means coupled to said memory system for receiving a query symbol;

memory means comprising a plurality of contiguous memory slots for the storage of one or more data sequences of symbols, one of said symbols being stored in each of said slots;

means operatively connected to each of said slots for indicating a state for each of said slots, said indicating means having two states, an active and an inactive state;

means responsive to a first signal being coupled to said memory system for initially setting the indicated state of each said indicating means to said active state;

comparing means for comparing the data sequence symbol stored in each said slot having said indicating means in said active state with said query symbol in said receiving means, said comparing means including means for changing the state of said indicating means to the inactive state after said comparison has been made and means for setting the state of the indicating means operatively connected to the next said slot to the active state if said data sequence symbol corresponds to said query symbol; and means responsive to a second signal being coupled to said memory system for retrieving each stored data sequence of symbols in which at least one of the symbols in such data sequence of symbols is stored in a slot whose corresponding indicating means is in said active state.

2. The memory system of claim 1 further comprising means for causing a data sequence of signals coupled to said memory system to be stored in said memory means.

3. The memory system of claim 1 wherein said indicating means comprises a one bit storage cell, a separate said storage cell being operatively connected to each said slot.

4. The memory system of claim 1 wherein said memory means comprises a plurality of contiguous segments of memory slots, each said segment including one or more contiguous memory slots, and wherein said comparing means includes a plurality of comparison circuits, one said comparison circuit being operatively connected to each of said segments, and wherein each of said comparison circuits includes means for comparing said query symbol with each data sequence symbol stored in a slot which is contained in said comparison circuit's corresponding segment and which has said indicating means in said active state.

5. The memory system of claim 1 wherein said data sequence symbols comprise three types of symbols, constants, variables, and delimiters, wherein said query symbol comprises one of said three types of symbols and wherein said setting means causes the state of the indicating means operatively connected to the next slot to be set to the active state when one of said query symbol or said data sequence symbol compared by said comparing means is a variable and the other is either a variable or a constant.

6. The memory system of claim 5 wherein said delimiters occur in corresponding pairs, an open delimiter defining the beginning of a sequence of symbols or a subsequence of symbols embedded in a sequence of symbols and the corresponding closing delimiter defining the end of said sequence of symbols or subsequence of symbols, said comparing means further comprising means for identifying the closing delimiter corresponding to a given open delimiter in a sequence of symbols, and wherein said comparing means causing the state of the indicating means operatively connected to said slot containing said open delimiter to be set to the inactive state and causing the state of the indicating means operatively connected to the slot following the slot containing the corresponding closing delimiter to be set to the active state when said comparing means compares a data sequence symbol which is an open delimiter to a variable query symbol.

7. The memory system of claim 6 further comprising hold means operatively connected to each said slot, each said hold means having two states, a ready state and a not ready state, wherein said not ready state indicates that the query symbol to be compared to the data sequence symbol stored in said slot has not yet been coupled to the memory system on said coupling means, wherein said ready state indicates that the symbol stored in said slot may be compared to the next query symbol provided the indicating means operatively connected to said slot is also in the active state, and wherein said comparing means includes means for setting the state of each said hold means to a not ready state when said hold means is operatively connected to a slot in the active state which contains a variable data sequence symbol and is being compared by said comparing means to an open delimiter query symbol, said means for changing the state of said indicating means being prevented from changing said indicating means to an inactive state after a comparison has been made when said comparing means compares a slot in the active state which is also in the not ready state, said comparing means including means for setting the state of each said hold means to a ready state when said comparing means detects the closing delimiter query symbol corresponding to the open delimiter query symbol which caused the state of said hold means to be changed to the not ready state, said comparing means in response thereto causing the indicating means operatively connected to said slot to be set to the inactive state, and causing the indicating means operatively connected to the slot following said slot to be set to the active state.

8. The memory system of claim 7 wherein each said slot comprises a plurality of one bit storage cells, said slot being divided into two groups, an identification group and a data group, said identification group including at least two said storage cells for specifying the type of symbol stored in said slot, and said data group including the rest of said storage cells in said slot, and wherein said means for identifying the closing delimiter corresponding to a given open delimiter comprises a label stored in the data group of each slot containing a delimiter, said label being the same for each corresponding pair of delimiters and said label not being repeated in the data group of any delimiter contained in the sequence or subsequence of symbols marked by said corresponding pair of delimiters.

9. The memory system of claim 6 wherein said data sequence symbols and said query symbol further include a gumpf symbol, and wherein said comparing means includes means for detecting a gumpf query symbol coupled to said memory system on said coupling means and for causing the state of all the indicating means operatively connected to the slots between the one containing the data sequence symbol compared to said gumpf query symbol and the one after the one containing the closing delimiter marking the end of the data sequence in which said data sequence symbol was contained to be set to the active state.

10. The memory system of claim 9 wherein said comparing means includes means for detecting a gumpf data sequence symbol;
wherein said comparing means includes means for causing the indicating means of the slot following the one containing said gumpf data sequence symbol to be set to the active state, and means for preventing said means for changing the state of said indicating means to the inactive state from setting the state of the indicating means operatively connected to the slot containing said gumpf symbol to an inactive state.

11. The memory system of claim 6 wherein said indicating means comprises a plurality of one bit storage cells, one of said storage cells being operatively connected to each said slot, and wherein said setting means includes means for setting the state of one or more said storage cells comprising:
an input means for setting the state of each said storage cell in response to a signal on an input terminal operatively connected to each said storage cell,
an output means for outputing the state of each said storage cell on an output terminal operatively connected to each said storage cell;
a jump path having a plurality of discrete switch elements, one of said switch elements operatively adjacent each said storage cell;
means for selectively causing said jump path to be non-conductive at a point operatively adjacent to each of said storage cells;
means for connecting the input terminal of each said storage cell to said jump path at a point on either one side or the other of the operatively adjacent switch element associated with each said storage cell; and
means for connecting the output terminal of each said storage cell to said jump path at a point on either one side or the other of the operatively adjacent switch element associated with each said storage cell.

12. A memory system for the storage and retrieval of data sequences of symbols in response to a query sequence of one or more symbols comprising:
means coupled to said memory system for receiving a query symbol;
memory means comprising a plurality of contiguous memory slots for the storage of one or more data sequences of symbols, one of said symbols being stored in each of said slots, said data sequence and query sequence symbols being of three types, constants, variables, delimiters, said delimiters occurring in corresponding pairs, an open delimiter marking the beginning of a sequence of symbols or of a subsequence of symbols embedded in a sequence of symbols and the corresponding closing delimiter marking the end of said sequence or subsequence of symbols;
wherein each said slot comprises a plurality of one bit storage cells, said slot being divided into two groups, an identification group and a data group, said identification group including at least two said storage cells for specifying the type of symbol stored in said slot, and wherein a label is stored in the data group of each slot containing a delimiter, said label being the same for each corresponding pair of delimiters and said label not being repeated in the data group of any slot storing a delimiter contained in the subsequence of symbols marked by said corresponding pair of delimiters;
means operatively connected to each of said slots for indicating a state for each of said slots, said indicating means having one of two states, an active state and an inactive state;
means responsive to a first signal being coupled to said memory system for initially setting the indicated state of each said indicating means to said active state;
means operatively connected to said receiving means and said memory means and responsive to a second signal coupled to said memory system for receiving and storing a data sequence of symbols in said memory means;
comparing means for comparing the data sequence symbol stored in a said slot with said query symbol if the indicating means operatively connected to said slot is in the active state, wherein said comparing means changes the state of said indicating means operatively connected to the slot containing the data sequence symbol being compared to said query symbol to the inactive state after said comparison has been made, wherein said comparing means includes means for causing the state of the indicating means operatively connected to the next said slot to be set to the active state if said data sequence symbol and said query symbol were identical or if at least one of said symbols compared by said comparing means was a variable, wherein said comparing means includes means for identifying the closing delimiter corresponding to a given open delimiter in a sequence of symbols, and includes means for causing the indicating means operatively connected to said slot containing said open delimiter to be set to the inactive state when said comparing means compares a data sequence symbol which is an open delimiter to a variable query symbol and for causing the state of the indicating means operatively connected to the slot following the slot containing a closing delimiter having the same label as that contained in the data group of the said slot containing said open delimiter to be set to the active state;

hold means operatively connected to each said slot, each said hold means having two states, a ready state and a not ready state, wherein said not ready state indicates that the query symbol to be compared to the data sequence symbol stored in said slot has not yet been coupled to the memory system on said coupling means, wherein said ready state indicates that the symbol stored in said slot may be compared to the next query symbol provided the indicating means operatively connected to sid slot is also in the active state, and wherein said comparing means includes means for setting the state of each said hold means to a not ready state when said hold means is operatively connected to a slot in the active state which contains a variable data sequence symbol and is being compared by said comparing means to an open delimiter query symbol, said comparing means being prevented from changing said indicating means to an inactive state after a comparison has been made when said comparing means compares a slot in the active state which is also in the not ready state;

said comparing means including means for setting the state of each said hold means to a ready state when said comparing means detects the closing delimiter query symbol corresponding to the open delimiter query symbol which caused the state of said hold means to be changed to the not ready state, said comparing means in response thereto causing the indicating means operatively connected to said slot to be set to the inactive state, and causing the indicating means operatively connected to the slot following said slot to be set to the active state; and means responsive to a preselected signal coupled to said memory system for retrieving each stored data sequence of symbols in which at least one of the symbols comprising said data sequence of symbols is stored in a slot in which the indicating means operatively connected to said slot is in said active state.

13. The memory system of claim 12 wherein said indicating means comprises a plurality of one bit storage cells, one of said storage cells being operatively connected to each said slot, and wherein said setting means includes means for setting the state of one or more said storage cells comprising:

an input means for setting the state of each said storage cell in response to a signal on an input terminal operatively connected to each said storage cell;

an output means for outputing the state of each said storage cell on an output terminal operatively connected to each said storage cell;

a jump path having a plurality of discrete switch elements, one of said switch elements operatively adjacent each said storage cell;

means for selectively causing said jump path to be non-conductive at a point operatively adjacent to each of said storage cells;

means for connecting the input terminal of each said storage cell to said jump path at a point on either one side or the other of the operatively adjacent switch element associated with each said storage cell; and means for connecting the output terminal of each said storage cell to said jump path at a point on either one side or the other of the operatively adjacent switch element associated with each said storage cell.

14. The memory system of claim 12 wherein said memory means comprises a plurality of contiguous segments of memory slots, each said segment including one or more contiguous memory slots, and said comparing means includes a plurality of comparison circuits, one said comparison circuit being operatively connected to each of said segments, and wherein each of said comparison circuits includes means for comparing said query symbol with each data sequence symbol stored in a slot which is contained in said comparison circuit to corresponding segment and which has said indicating means in said active state.

15. The memory system of claim 12 wherein said memory means is divided into a plurality of memory pages, each said memory page comprising a contiguous segment of N said slots, the first said N slots of said memory means being on the first said page and being numbered from 1 to N, the second said N slots of said memory means being on the second said page and being numbered from 1 to N, and so on, a data sequence being stored in a contiguous block of memory cells in said memory means irrespective of said division into memory pages, and wherein said comparing means comprises:

means for specifying a memory page;

enabling means coupled to each said memory page for specifying one of two states for the memory page to which it is coupled, said states comprising a first state which enables said memory page to be specified by said memory page specifying means and a second state which prevents said memory page from being specified by said memory page specifying means;

N comparison circuits operatively coupled to said memory means and to each other, said comparison circuits being numbered from 1 to N, the Ith said comparison circuit, I counting from 1 to N, making comparisons between a query sequence symbol coupled to said memory system and a data sequence symbol stored in the Ith slot on the page specified by said memory page specifying means;

means for causing said enabling means to specify said first state for all pages containing at least one memory slot having an indicating means in the active state and for causing said enabling means to specify said second state for all other pages;

means for causing said memory page specifying means to specify the first page having an enabling means specifying said first state;

means for causing said enabling means coupled to each said memory page to specify said first state when a variable query sequence symbol is coupled to said memory means even when no memory slots on a given page have an indicating means in the active state;

means for causing said enabling means to specify said first state for the memory page following the memory page currently specified by said memory page specifying means if the data sequence symbol stored in the last memory slot on the currently specified memory page matches the query sequence symbol coupled to said memory system; and means for causing said memory page specifying means to sequentially specify the next memory page having an enabling means specifying said first state until all memory pages having an enabling means in said first state have been so specified.

16. The memory system of claim 12 wherein said memory system comprises a single integrated circuit chip.

* * * * *